United States Patent

Baskaran et al.

[11] Patent Number: 5,973,086
[45] Date of Patent: Oct. 26, 1999

[54] PROCESS FOR THE LIVING ANIONIC POLYMERIZATION OF ALKYL (METHACRYLIC) MONOMERS USING A NOVEL INITIATOR SYSTEM

[75] Inventors: Durairaj Baskaran; Swaminathan Sivaram, both of Maharashtra, India

[73] Assignee: Council of Scientific & Industrial Research, New Delhi, India

[21] Appl. No.: 08/774,035

[22] Filed: Dec. 27, 1996

[30] Foreign Application Priority Data

Dec. 29, 1995 [IN] India ................... 2461/Del/95

[51] Int. Cl.⁶ ................... C08F 4/10; C08F 20/14
[52] U.S. Cl. ................... 526/175; 526/174; 526/180; 526/181; 526/182; 526/183; 526/190; 526/220; 526/329.7
[58] Field of Search ................... 526/174, 175, 526/180, 181, 182, 183, 190, 220, 329.7

[56] References Cited

U.S. PATENT DOCUMENTS 4,201,729  5/1980  Tung et al. ................... 526/176 X
4,767,824  8/1988  Ouhadi et al. ................... 526/175 X
5,057,583  10/1991  Tung et al. ................... 526/175

*Primary Examiner*—Fred Teskin
*Attorney, Agent, or Firm*—Ladas & Parry

[57] ABSTRACT

A process for the living anionic polymerization of alkyl (meth)acrylic monomers, involving polymerizing the monomers in the presence of an initiator comprising a carbanion and a metal or nonmetal salt of perchloric acid. The initiator has the formula (I):

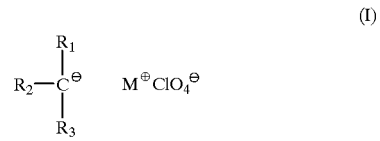

wherein $R_1$=a linear or branched alkyl group having one to six carbon atoms, $R_2$=a phenyl or alkyl group having one to six carbon atoms, $R_3$=a phenyl or an ester group and $M^+$ is an alkali, alkaline earth metal or quarternary ammonium cation containing 1–8 carbon atoms in an alkyl group thereof.

19 Claims, No Drawings

PROCESS FOR THE LIVING ANIONIC POLYMERIZATION OF ALKYL (METHACRYLIC) MONOMERS USING A NOVEL INITIATOR SYSTEM

FIELD OF THE INVENTION

This invention relates to an improved process for the living anionic polymerization of alkyl(meth)acrylates. More particularly, the present invention relates to an improved process for producing poly alkyl(meth)acrylates of narrow molecular weight distribution using a novel initiator system.

BACKGROUND OF INVENTION

The anionic polymerization of non-polar monomers such as styrene and dienes are well known in the prior act (U.S. Pat. Nos. 2,351,924; 4,414,372; Brit. Patent No. A-0 145 263; Macromolecules 1984, 17, 1415–1417). The feasibility of preparing well-defined homo and block copolymers with terminal-functional groups has been demonstrated using this technique. However, the extension of this method to polar monomers such as alkyl(meth)acrylates is complicated and requires specific experimental conditions that minimizes the occurence of secondary reactions arising due to the nucleophilic attack of carbonyl group and acidic-hydrogen atom of the acrylates (Polymers, 3, 175,1962; J. Polym. Sci. Poly. Chem., 12, 2295,1974; and Polym. J., 4, 271, 1973).

The secondary side reactions in anionic polymerization of alkyl(meth)acrylate are basically due to the solvation of metal ions by carbonyl group, present in both the monomer and the propagating species.

To avoid such side reactions, many approaches are documented in the prior art. The external solvation of the metal ion by a polar solvent at low temperature helps in controlling ion-pair aggregation and minimizes the secondary reactions. Thus, for successful living anionic polymerization of alkyl (meth)acrylate one requires the use of a sterically bulky anion in polar solvents such as tetrahydrofuran (THF) at low temperature, typically less than $-70°$ C. Atempts have been made to alter the reactivity of the propagating species by adding adjuvants such as solvating agents (J. Polym. Sci. Part A, Poly. Chem., 28, 1033, 1990), alkali metal alkoxides (Makromol. Chem., 191, 1657,1990), alkali halides (Luxemborg patent 85627, Nov. 5, 1984; U.S. Pat. No. 4,767,824,1988), aluminum alkyls (Polym. Bull., 20(6),505, 1988). Other new initiator systems have also been described for the living anionic polymerization of alkyl(meth) acrylates. These are, aluminum porphyrin(Macromolecules, 20, 3076,1987), metal free anionic initiators (Polym. Prep. 32(1), 296, 1991 and Macromolecules, 24, 1697, 1991) and other metal catalysts (J. Am. Chem. Soc., 114,5460 and 4908, 1992).

Highly stabilized anionic initiators bearing tetra-n-butyl ammonium cations have been claimed as good initiating systems for alkyl(meth)acrylates at 25° C. and above (Angew. Chem. Int. Ed. Engl. 27,1373, 1988; and U.S. Pat. No. 5,194,537, 1993). The process of nucleophile assisted group transfer polymerization of silyl ketene acetals is also useful for the living polymerization of alkyl(meth)acrylates and other a,B,-unsaturated carbonyl monomers. Substantial progress has been achieved recently in the controlled polymerization of alkyl(meth)acrylates by group transfer polymerization method (J. Am. Chem. Soc., 105, 5706, 1983; New Methods of Polymer Synthesis, J. R. Ebdon; Ed, Blackie, pp 22–75, 1991).

However, one of the drawbacks of the group transfer polymerization method, is the difficulty in synthesizing block copolymer of alkyl(meth)acrylates with monomers such as styrene, dienes and heterocyclic monomers. Resonance stabilized metal free carbanion initiators are also limited to only alkyl(meth)acrylates and does not allow sequential block copolymerization with styrene and dienes.

It is well known that use of specific adjuvants in the anionic polymerization of alkyl(meth)acrylates modify the reactivity of propagating chain end and thus help to minimize undesirable side reactions during propagation. For example, tert-alkoxides as adjuvants, stabilizes the propagating chain end and is used to suppress the intramolecular cyclization (auto termination) reaction (Polym. Prep., 29(2), 29, 1988; Makromol. Chem., 193,101,1992, and J. Makromol. Chem., 194, 841, 1993).

The use of an alkali halide such as LiCl also has a beneficial effect and plays a major role in influencing the dynamic equilibrium of aggregated and non-aggregated ion-pairs during polymerization. In presence of LiCl, anionic polymerization of methyl methacrylate and t-butylacrylate proceed satisfactorily, giving good control on molecular weight and polydispersity. However, such a control in presence of LiCl can only be achieved in a polar solvent such as tetrahydrofuran at $-78°$ C. (Macromolecules, 24, 4997, 991; 20, 1442, 1987; and 23, 2618, 1990). Using conventional anionic initiators such as 1,1'-diphenylhexyl lithium, alpha-methyl styryl lithium, diphenyl methyl lithium and alkyl alpha-lithioisobutyrate and LiCl, no control on polymerization of alkyl(meth)acrylate can be achieved in toluene or toluene-tetrahydrofuran mixtures (9:1 v/v).

Anionic polymerization of methyl methacrylate in toluene-tetrahydrofuran 9:1 (v/v) solvent at $-78°$ C. is complicated and often leads to gel formation due to uncontrolled propagation reaction. This situation can be improved by addition of LiCl but only broad MWD (1.5) poly methyl methacrylate can be obtained at $-78°$ C. (Macromolecules 23, 2618–2622, 1990).

SUMMARY OF THE INVENTION

We have now found that certain perchlorate salts, added in suitable amounts, promote the anionic polymerization of alkyl(meth)acrylates initiated by organolithium both in tetrahydrofuran and in toluene-tetrahydrofuran (9:1, v/v) mixed solvent without any appreciable complications. The polymerization is living as evidenced by excellent molecular weight control and narrow polydispersities.

The main object of the present invention is therefore a) to provide a process for the polymerization of alkyl(meth) acrylate in presence of perchlorate salts using an anionic initiator in tetrahydrofuran or a suitable mixture of tetrahydrofuran and an aromatic solvent b) to enable the polymerization to be conducted in temperature range $-78°$ C. to $-20°$ C. with adequate control on polymerization, c) to enable the production of polymers with a wide range of molecular weight by mere control of initiator concentration in presence of excess perchlorate salts d) to enable the production of block/statistical copolymers using two or three different alkyl(meth)acrylate monomers and e) to produce polymers/copolymers with narrow molecular weight distribution with polydispersities in the range of 1.03 to 1.18, defined as the ratio of weight average to number average molecular weights.

DETAILED DESCRIPTION

The ability to achieve living anionic polymerization of alkyl(meth)acrylates in a mixture of aromatic hydrocarbon and tetrahydrofuran is particularly note worthy from an economical point of view. Aromatic hydrocarbons are less expensive solvents and relatively safer to handle in commercial practice compared to tetrahydrofuran. Furthermore, storage of tetrahydrofuran requires stringent conditions to prevent formation and accumulation of hazardous peroxides. For this reason tetrahydrofuran is not a preferred solvent in industrial polymerization.

Accordingly the present invention provides an improved process for the anionic polymerization of alky(meth)acrylate monomers by using a novel initiating system consisting of carbanions in connection with metal or non-metal salt of perchloric acid, the initiator system having the following formula (I)

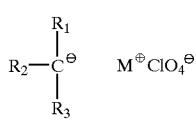

where $R_1$=linear or branched alkyl group having one to six carbon atoms, $R_2$=phenyl or alkyl group having one to six carbon atoms, $R_3$=phenyl or an ester group and $M^+$ is an alkali or alkaline earth metal or a quarternary alkyl substituted ammonium cations, containing 1–8 carbon atoms in the alkyl group.

The carbanions represented by formula (I) can be prepared by reacting one mole of n-,sec-, or tert-butyllithium with 1,1-diphenylethylene or alpha-methylstyrene and also by direct metalation of methyl or ethyl isobutyrate using lithium diisopropylamide followed by reaction with excess metal perchlorate. The present invention provides for an improved process for controlled homo block/statistical co-polymerization of alkyl(meth)acrylate monomers, which comprises of polymerizing alkyl(meth)acrylate to poly alkyl (meth)acrylate having narrow molecular weight distribution (polydispersity of <1.18), in presence of initiators having formula I and excellent control on molecular weights, either in pure tetrahydrofuran or a suitable mixture of an aromatic hydrocarbon and tetrahydrofuran in the temperature range between −78° C. to −40° C.

Any of the widely available and used alkyl (meth) acrylates can be used in the process. These include methyl methacrylate, ethyl methacrylate, n-butyl methacrylate, lauryl methacrylate, methylacrylate, ethyl acrylate, n-butylacrylate, 2-ethylhexyl acrylate and t-butyl acrylate.

Typically, the concentration of organolithium initiator is between 0.3 to 2 moles/liter. The concentration of alkyl (meth)acrylate is in the range of 0.1 to 0.3 moles/liter. The mole ratio of organolithium to the perchlorate salt can vary from 1:1 to 1:20. However the preferred ratio is 1:10. The temperature of the reaction can be varied anywhere between −40° to −78° C. The process can employ either pure tetrahydrofuran or a mixture of tetrahydrofuran and an aromatic hydrocarbon. While using the latter, the lowest volume % of tetrahydrofuran in the mixture should not be below 5%. A 90:10 v/v aromatic hydrocarbon tetrahydrofuran mixture is preferred. The aromatic hydrocarbon can be chosen from amongst the following: benzene, toluene, xylene, ethylbenzene, mesitylene and tetralin. The preferred solvent is toluene.

If desired other non-halogenated polar solvent such as tetrahydropyron or 1,2-dimethyoxyethane may be used.

By suitable choice of the monomer to initiator ratio, polymers with predetermined molecular weight can be prepared using this new initiator system. A linear dependence of monomer conversion with time and number average molecular weight (Mn) with conversion iis observed indicating that the new initiator system is free of secondary side reactions such as termination, transfer, intera-molecular cyclization and exhibits characteristic of a living polymerization.

The invention is further illustrated by following specific examples, which should not however be construed to limit the scope of this invention, in any manner.

EXAMPLE 1

Polymerization of methyl methacrylate in tetrahydrofuran using 1,1'-diphenylhexyllithium (DPHLi)-LiClO4 initiator system at −78° C.

Into a dry 250 mL round bottom flask equipped with magnetic needle, nitrogen/vacuum three way adapter with rubber septum, was added 100 mL dry tetrahydrofuran and 1.3 mL of tetrahydrofuran solution containing $11.5\times10^{-3}$ mol $LiClO_4$ under a nitrogen atmosphere. A tetrahydrofuran solution of DPHLi, was added dropwise to the above mixture until the initiator colour persisted; Approximately, 0.4 mL of 0.048 M initiator solution was generally required to get a persistent colour. Then 2.4 mL of 0.048 M DPHLi in tetrahydrofuran ($1.15\times10^{-3}$ mole) solution was added and the reaction flask was cooled to −78° C. After few minutes, 2.85 g of purified methyl methacrylate (freshly distilled from greenish yellow colour tri-isobutylaluminum-methyl methacrylate complex) was transferred by stainless steel capillary under stirring and the polymerization was performed at −78° C. for 15 min. The reaction was terminated by adding acidic methanol. The polymer was recovered by precipitation into methanol water mixture (60/40, v/v). The crude polymer was dried at 40° C. for four hours under vacuum giving 2.78 g of poly(methyl methacrylate) ( 98% conversion). Gel permeation chromatography (hereinafter referred to as GPC) showed that the polymer had a Mn=27, 800, Mw=30234 and Mw/Mn=1.08.

EXAMPLE 2

Polymerization of methylmethacrylate in tetrahydrofuran using 1,1'-diphenylhexyllithium (DPHLi)-$LiClO_4$ initiator system at −40° C.

Into a dry 250 mL round bottom flask equipped with magnetic needle, nitrogen/vacuum three way adapter with rubber septum, was added 100 mL dry tetrahydrofuran and 1.3 mL of tetrahydrofuran solution containing $11.5\times10^{-3}$ mol $LiClO_4$ under a nitrogen atmosphere. A tetrahydrofuran solution of DPHLi, was added dropwise to the above mixture until the initiator colour persisted; Approximately, 0.4 mL of 0.048 M initiator solution was generally required to get a persistent colour.

Then 2.4 mL of 0.048 M DPHLi in tetrahydrofuran ($1.15\times10^{-3}$ mole) solution was added and the reaction flask was cooled to −40° C. After few minutes, 2.85 g purified methyl methacrylate (freshly distilled from greenish yellow colour tri-isobutylaluminum—methylmethacrylate complex) was transferred by stainless steel capillary under stirring and the polymerization was performed at −40° C. for 15 min. The reaction was terminated by adding acidic methanol. The polymer was recovered by precipitation into methanol water mixture (60/40 v/v). The crude polymer was dried at 40° C. for four hours under vacuum giving 2.74 g of poly(methyl methacrylate) (96% conversion). GPC showed that the polymer had a Mn=23,001, Mw=24,760 and Mw/Mn =1.07.

EXAMPLE 3

Polymerization of methylmethacrylate in toluene-tetrahydrofuran (9:1, v/v) using 1,1'-diphenylhexyllithium (DPHLi)-LiClO$_4$ initiator system at $-78°$ C.

Into a dry 250 mL round bottom flask equipped with magnetic needle, nitrogen/vacuum three way adapter with rubber septum, was added 90 mL of dry toluene and 10 mL of dry tetrahydrofuran and 1.3 mL of tetrahydrofuran solution containing 17.5×10$^3$ mole LiClO$_4$ under a nitrogen atmosphere A tetrahydrofuran solution of DPHLi was added dropwise to the above mixture until the initiator colour persisted; Approximately 0.4 mL of 0.048 M initiator solution was generally required to get a persistent colour. Then 3.65 mL of 0.048 M DPHLi in tetrahydrofuran (1.75×10$^{-3}$ mole) was added and the reaction flask was cooled to $-78°$ C. After few minutes, 2 g of purified methylmethacrylate (freshly distilled from greenish yellow colour tri-isobutylaluminum—methylmethacrylate complex) was transferred by stainless steel capillary under stirring and the polymerization was performed at $-78°$ C. for 30 min. The reaction was terminated by adding acidic methanol. The polymer was recovered by precipitation into methanol water mixture (60/440 v/v). The crude polymer was dried at 40° C. for four hours under vacuum giving 1.6 g (86% conversion) of poly(methylmethacrylate). GPC showed that the polymer had a Mn=10,110, Mw, 10,641 and Mw/Mn=1.05.

EXAMPLE 4

Polymerization of methylmethacrylate in toluene-tetrahydrofuran (9:1, v/v) using 1,1-diphenylhexyllithium (DPHLi)-LiClO$_4$ initiator system at $-40°$ C.

In to a dry 250 mL round bottom flask equipped with magnetic needle, nitrogen/vacuum three way adapter with rubber septum, was added 90 mL of dry toluene and 10 mL of dry tetrahydrofuran and 1.3 mL of tetrahydrofuran solution containing 2.15×10$^{-3}$ mole of LiClO$_4$ under nitrogen atmosphere. A tetrahydrofuran solution of DPHLi was added dropwise to the above mixture until the initiator colour persisted; Approximately 0.4 mL of 0.048 M initiator solution was generally required to get a persistent colour. Then 1.4 mL of 0.048 M DPHLi in tetrahydrofuran (0.67×10$^{-3}$ mole) was added and the reaction flask was cooled to $-40°$ C. After few minutes, 2.8 g of purified methylmethacrylate (freshly distilled from greenish yellow colour of tri-isobutylaluminum methylmethacrylate complex) was transferred by stainless steel capillary under stirring and the polymerization was performed at $-40°$ C. for 20 min. The polymer was recovered by precipitation into methanol water mixture (60/40 v/v). The crude polymer was dried 0 at 40° C. for four hours under vacuum giving 1.7 g of poly (methylmethacrylate) (61% conversion). GPC showed that the polymer had a Mn 27,069, Mw=29,737 and Mw/Mn=1.09.

EXAMPLE 5

Kinetics of methyl methacrylate polymerization in toluene-tetrahydrofuran (9:1,v/v) using 1,1'-diphenylhexyllithium (DPHLi)-LiClO$_4$ initiator system at $-78°$ C.

Into a dry 250 mL round bottom flask equipped with magnetic needle, nitrogen/vacuum three way adapter with rubber septum, was added 90 mL of dry toluene and 10 mL of dry tetrahydrofuran and 1.3 mL of tetrahydrofuran solution containing 11.5×10$^{-3}$ mole LiClO$_4$ under a nitrogen atmosphere. A tetrahydrofuran solution of DPHLi was added dropwise to the above mixture until the initiator colour persisted; Approximately 0.4 mL of 0.048 M initiator solution was generally required to get a persistent colour. Then 2.4 mL of 0.048 M DPHLi in tetrahydrofuran (1.15×10$^3$ mole) was added and the reaction flask was cooled to $-78°$ C. After few minutes, 3.74 g of purified methyl methacrylate (freshly distilled from greenish yellow colour tri-isobutylaluminum—methacrylate complex) was transferred by stainless steel capillary under stirring and the polymerization was performed at $-78°$ C. Samples of the reaction mixture was withdrawn after 30, 60, 90, 120 and 200 minutes and terminated by acidic methanol. The polymer was recovered by precipitation into methanol-water mixture (60/40, v/v). The crude polymer was dried at 40° C. for four hours under vacuum. The values of Mn and Mw/Mn as determined by GPC are shown in Table 1. The results clearly indicate that the polymerization is "living" in nature.

TABLE 1

| Time, min | % of Conversion | Mn GPC | Mw/Mn |
|---|---|---|---|
| 30 | 42.3 | 11148 | 1.08 |
| 60 | 73.6 | 17600 | 1.12 |
| 90 | 78.3 | 24284 | 1.13 |
| 120 | 93.4 | 28119 | 1.14 |
| 200 | 100 | 34324 | 1.13 |

EXAMPLE 6

Polymerization of tert-butylacrylate in tetrahydrofuran using 1,1'-diphenylhexyllithium (DPHLi)-LiClO$_4$ initiator system at $-78°$ C.

Into a dry 250 mL round bottom flask equipped with magnetic needle, nitrogen/vacuum three way adapter with rubber septum, was added 90 mL of dry toluene and 10 mL of dry tetrahydrofuran and 1.3 mL of tetrahydrofuran solution containing 11.5×10$^{-3}$ mole LiClO$_4$ under a nitrogen atmosphere. A tetrahydrofuran solution of DPHLi was added dropwise to the above mixture until the initiator colour persisted; Approximately 0.4 mL of 0.048 M initiator solution was generally required to get a persistent colour. Then 2.4 mL of 0.048 M DPHLi in tetrahydrofuran (1.15×10$^{-3}$ mole) was added and the reaction flask was cooled to $-78°$ C. After a few minutes, 2.85 g of purified tert-butylacrylate was added and the polymerization was performed at $-78°$ C. for 15 minutes. The reaction was terminated by adding acidified methanol. The polymer was recovered by precipitation into methanol water mixture (60/40 v/v). The crude polymer was dried at 40° C. for four hours under vacuum giving 2.8 of poly(tert-butyl acrylate) (98% conversion). GPC showed that the polymer had a Mn=34,043, Mw=40,406 and Mw/Mn=1.18.

We claim:

1. A process for the living anionic polymerization of alkyl(meth)acrylic monomers, comprising polymerizing the monomers in the presence of an initiator comprising a carbanion and a metal or nonmetal salt of perchloric acid, said initiator having the formula (I):

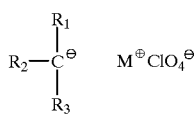

wherein $R_1$=a linear or branched alkyl group having one to six carbon atoms, $R_2$=a phenyl or alkyl group having one to six carbon atoms, $R_3$=a phenyl or an ester group and $M^+$ is an alkali, alkaline earth metal or quarternary ammonium cation containing 1–8 carbon atoms in an alkyl group thereof.

2. A process as claimed in claim 1, wherein the carbanion is a reaction product of n-, sec-, or tert-butyl lithium with 1,1-diphenyl ethylene or alpha-methylstyrene.

3. A process as claimed in claims 1 wherein the carbanion is derived from the reaction of methyl isobutyrate with lithium diisopropylamide.

4. A process as claimed in claim 1, wherein the salt of perchloric acid is selected from the group consisting of lithium perchlorate, potassium perchlorate, magnesium perchlorate, barium perchlorate, tetrabutylammonium perchlorate and benzyltriethyl ammonium perchlorate.

5. A process as claimed in claim 1, wherein the alkyl (meth) acrylic monomers comprise methyl methacrylate, ethyl methacrylate, butylmethacrylate, t-butylacrylate, 2-ethylhexylacrylate, butylacrylate or ethylacrylate.

6. A process as claimed in claim 1, wherein the polymerization is conducted in a solvent comprising tetrahydrofuran.

7. A process as claimed in claim 6, wherein the solvent is a mixture of aromatic hydrocarbon and tetrahydrofuran and wherein the volume % of tetrahydrofuran in the mixture is at least 5%.

8. A process as claimed in claim 7, wherein the aromatic hydrocarbon is toluene, benzene, xylene, ethylbenzene, mesilylene or tetralin.

9. A process as claimed in claim 1, wherein the polymerization is conducted in a vessel to which an organo lithium compound and an alkali metal perchlorate are added in a mole ratio of organolithium compound to alkali metal perchlorate of between 1:1 to 1:20.

10. A process as claimed in claim 1, wherein the polymerization is conducted at a reaction temperature between −20 to −70° C.

11. A process as claimed in claim 1, wherein the molecular weight of a polymer formed by said polymerization is controlled by varying the weight in grams of the monomers and the number of moles of the initiator.

12. A process as claimed in claims 1, wherein polys are formed having a ratio of weight average to number average molecular weights of less than 1.2.

13. In a process for anionic polymerization of alkyl(meth) acrylic monomers, wherein the polymerization is initiated by adding the monomers, an organo lithium compound and a solvent to a reactor, the improvement comprising also adding to the reactor a metal or nonmetal salt of perchloric acid, said organo lithium compound and salt of perchloric acid ionizing in the solvent to form ions, including a carbanion and a cation, said carbanion comprising $R_1$, $R_2$, and $R_3$ substituent groups, wherein $R_1$ is a linear or branched alkyl group having one to six carbon atoms, $R_2$, is a phenyl or alkyl group having one to six carbon atoms, and $R_3$ is a phenyl or an ester group; said cation comprising an alkali, an alkaline earth metal or a quarternary ammonium cation containing 1–8 carbon atoms in an alkyl group thereof, said organo lithium compound and salt of perchloric acid being selected and being added to the reactor in respective amounts sufficient to promote the anionic polymerization of said monomers.

14. A process as claimed in claim 13, wherein the carbanion is a reaction product of n-, sec-, or tert-butyl lithium with 1,1-diphenyl ethylene or alpha-methylstyrene.

15. A process as claimed in claim 13, wherein the carbanion is derived from the reaction of methyl isobutyrate with lithium diisopropylamide.

16. A process as claimed in claim 13, wherein the salt of perchloric acid is selected from the group consisting of lithium perchlorate, potassium perchlorate, magnesium perchlorate, barium perchlorate, tetrabutylammonium perchlorate and benzyltriethyl ammonium perchlorate.

17. A process as claimed in claim 13, wherein the solvent is tetrahydrofuran or a mixture of aromatic hydrocarbon and tetrahydrofuran and wherein the volume % of tetrahydrofuran in the mixture is at least 5%.

18. A process as claimed in claim 13, wherein the mole ratio of the organo lithium compound to the salt of perchloric acid is between 1:1 to 1:20.

19. A process as claimed in claim 13 comprising polymerizing the monomers to form a poly having a ratio of weight average to number average molecular weight of less than 1.2.

* * * * *